(12) United States Patent
Sheng

(10) Patent No.: US 10,891,141 B2
(45) Date of Patent: Jan. 12, 2021

(54) PLUGIN LOADING METHOD AND APPARATUS, TERMINAL, AND STORAGE MEDIUM

(71) Applicant: Tencent Technology (Shenzhen) Company Limited, Shenzhen (CN)

(72) Inventor: Shidong Sheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 105 days.

(21) Appl. No.: 16/287,535

(22) Filed: Feb. 27, 2019

(65) Prior Publication Data

US 2019/0196848 A1    Jun. 27, 2019

Related U.S. Application Data

(63) Continuation of application No. PCT/CN2017/114477, filed on Dec. 4, 2017.

(30) Foreign Application Priority Data

Dec. 5, 2016    (CN) .......................... 2016 1 1101498

(51) Int. Cl.
*G06F 9/44* (2018.01)
*G06F 9/445* (2018.01)
(Continued)

(52) U.S. Cl.
CPC ........ *G06F 9/44526* (2013.01); *G06F 9/4881* (2013.01); *G06F 9/5055* (2013.01)

(58) Field of Classification Search
CPC .......... G06F 8/61; G06F 8/62; G06F 9/44521; G06F 9/44526
See application file for complete search history.

(56) References Cited

U.S. PATENT DOCUMENTS

2005/0060698 A1* 3/2005 Boykin ............... G06F 9/44526
717/166
2012/0151464 A1* 6/2012 Koren ................. G06F 9/44521
717/166
(Continued)

FOREIGN PATENT DOCUMENTS

CN          102411506 A    4/2012
CN          103514395 A    1/2014
(Continued)

OTHER PUBLICATIONS

Zhaochun, "CN104731625A Method, device and mobile terminal for loading plugin", Jun. 24, 2015, Espacenet translated, 25 pages (Year: 2015).*

(Continued)

*Primary Examiner* — Duy Khuong T Nguyen
(74) *Attorney, Agent, or Firm* — Brinks Gilson & Lione

(57) ABSTRACT

The present disclosure discloses a method for plugin loading. The method includes obtaining an identifier of a plugin component of a plugin from a threading module, recording the identifier of the plugin component, and replacing the identifier of the plugin component with an identifier of a host component of an application program. The method also includes sending the identifier of the host component to a threading module, to perform system permission verification and receiving runnable notification information when passing the verification. The method further includes in response to the received runnable notification information, replacing the identifier of the host component with the identifier of the plugin component according to the recorded identifier of the plugin component; and sending the identifier of the plugin component to the threading module, to load the plugin. The present invention further discloses an apparatus and a storage medium for plugin loading.

17 Claims, 16 Drawing Sheets

(51) Int. Cl.
   *G06F 9/50*      (2006.01)
   *G06F 9/48*      (2006.01)

(56)        References Cited

U.S. PATENT DOCUMENTS

2014/0282471 A1*  9/2014  Chaney ................... G06F 8/71
                                                   717/170
2015/0012924 A1*  1/2015  Liu ..................... G06F 9/44526
                                                   719/318
2016/0094473 A1*  3/2016  Mordani ................ G06F 16/27
                                                   709/226
2017/0308902 A1* 10/2017  Quiroga ............ G06Q 20/3821

FOREIGN PATENT DOCUMENTS

CN       103744669 A      4/2014
CN       104375861 A      2/2015
CN       104679572 A      6/2015
CN       104731625 A      6/2015
CN       105740033        7/2016

OTHER PUBLICATIONS

International Search Report received for PCT Application No. PCT/CN2017/114477 dated Mar. 14, 2018 (with brief English translation), 4 pages.
Chinese Office Action and concise translation regarding 201611101498.6 dated Oct. 14, 2020, 10 pages.

* cited by examiner

PLUGIN LOADING METHOD AND APPARATUS, TERMINAL, AND STORAGE MEDIUM

RELATED APPLICATION

This application claims priority to PCT Patent Application No. PCT/CN2017/114477, filed on Dec. 4, 2017, which claims priority to Chinese Patent Application No. 201611101498.6, filed on Dec. 5, 2016, both of which are incorporated by reference in their entireties.

FIELD OF THE TECHNOLOGY

The present disclosure relates to terminal application loading technologies, and in particular, to a plugin loading method and apparatus, a terminal, and a storage medium.

BACKGROUND OF THE DISCLOSURE

With the increasing development of operating systems of terminals, third-party application (App) functions are more complete, causing more App code projects, and finally causing method counts to exceed the standard. Therefore, splitting and decoupling projects have become inevitable processes for App development teams. At this time, a plugin framework solution appears and provides a perfect solution to resolve the foregoing requirement. The plugin framework solution not only can reduce tolerance of Apps, but also can push a user to update a more stable function in time, to improve user experience and enrich product dimensions to some extent.

Currently, a plugin framework solution used in an operating system of a terminal has the following problems: 1) For a conventional plugin framework solution, a plugin App needs to be modified correspondingly to meet scheduling of a host App, which greatly increases development costs; and running of a component of the plugin App is not scheduled by a system, and therefore, the plugin App does not have an attribute of a system component; 2) For a DroidPlugin plugin framework solution, there is a large risk in adaptation, that is, running is not perfect in some manufacturers and newly released versions of operating systems, and large adaptation costs are needed to complete running of the plugin App.

In can be seen that, currently there is no suitable plugin framework solution.

SUMMARY

In view of this, embodiments of the present disclosure are expected to provide a plugin loading method and apparatus, a terminal, and a storage medium, to ensure a plugin component with an original component attribute of a system and also with high adaptation.

The technical solutions of the embodiments of the present disclosure are implemented as follows:

According to one aspect, an embodiment of the present disclosure provides a method for plugin loading. The method includes when a plugin is started, obtaining, by a device comprising a memory and a processor in communication with the memory, an identifier of a plugin component of the plugin from a threading module, wherein the threading module is a parent class component of a host module. The method also includes recording, by the device, the identifier of the plugin component, and replacing the identifier of the plugin component with an identifier of a host component of an application program, wherein the application program is a host program of the plugin. The method includes sending, by the device, the identifier of the host component to the threading module, to perform system permission verification and receiving, by the device, runnable notification information from the threading module when the identifier of the host component passes the system permission verification. The method further includes in response to the received runnable notification information, replacing, by the device, the identifier of the host component with the identifier of the plugin component according to the recorded identifier of the plugin component; and sending, by the device, the identifier of the plugin component to the threading module, to load the plugin.

According to another aspect, an embodiment of the present disclosure provides an apparatus for plugin loading. The apparatus includes a memory storing instructions and a processor in communication with the memory. When the processor executes the instructions, the processor is configured to cause the apparatus to, when a plugin is started, obtain an identifier of a plugin component of the plugin from a threading module, wherein the threading module is a parent class component of a host module. When the processor executes the instructions, the processor is configured to cause the apparatus to record the identifier of the plugin component, and replace the identifier of the plugin component with an identifier of a host component of an application program, wherein the application program is a host program of the plugin. When the processor executes the instructions, the processor is configured to cause the apparatus to send the identifier of the host component to the threading module, to perform system permission verification, and receive runnable notification information from the threading module when the identifier of the host component passes the system permission verification. When the processor executes the instructions, the processor is configured to further cause the apparatus to, in response to the received runnable notification information, replace the identifier of the host component with the identifier of the plugin component according to the recorded identifier of the plugin component, and send the identifier of the plugin component to the threading module, to load the plugin.

In another aspect, an embodiment of the present disclosure provides a non-transitory computer readable storage medium storing instructions. The instructions, when executed by a processor, cause the processor to, when a plugin is started, obtain an identifier of a plugin component of the plugin from a threading module, wherein the threading module is a parent class component of a host module. The instructions, when executed by a processor, cause the processor to record the identifier of the plugin component, and replace the identifier of the plugin component with an identifier of a host component of an application program, wherein the application program is a host program of the plugin. The instructions, when executed by a processor, cause the processor to send the identifier of the host component to the threading module, to perform system permission verification and receive runnable notification information from the threading module when the identifier of the host component passes the system permission verification. The instructions, when executed by a processor, further cause the processor to, in response to the received runnable notification information, replace the identifier of the host component with the identifier of the plugin component according to the recorded identifier of the plugin component; and send the identifier of the plugin component to the threading module, to load the plugin.

The embodiments of the present disclosure provide a plugin loading method and apparatus, a terminal, and a storage medium. It can be seen that, in the embodiments of the present disclosure, a child class threading module is constructed to replace an original parent class component function of a system, to guarantee that a plugin component bypasses system permission verification to run in a system environment, thereby ensuring the plugin component with an original component attribute of the system and further with high adaptation.

DESCRIPTION OF EMBODIMENTS

The following clearly and completely describes the technical solutions in the embodiments of the present disclosure with reference to the accompanying drawings in the embodiments of the present disclosure.

Figure 1A:
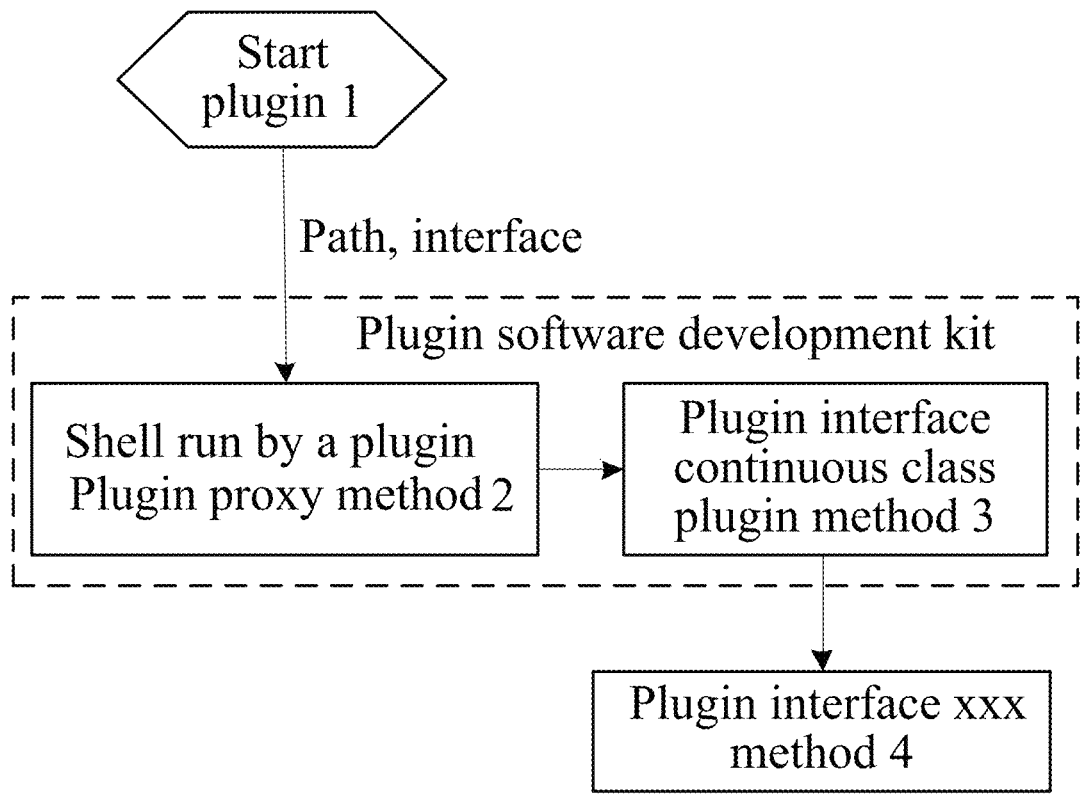
FIG. 1A is a schematic diagram of a conventional plugin framework solution in the related technology.
Figure 1B:
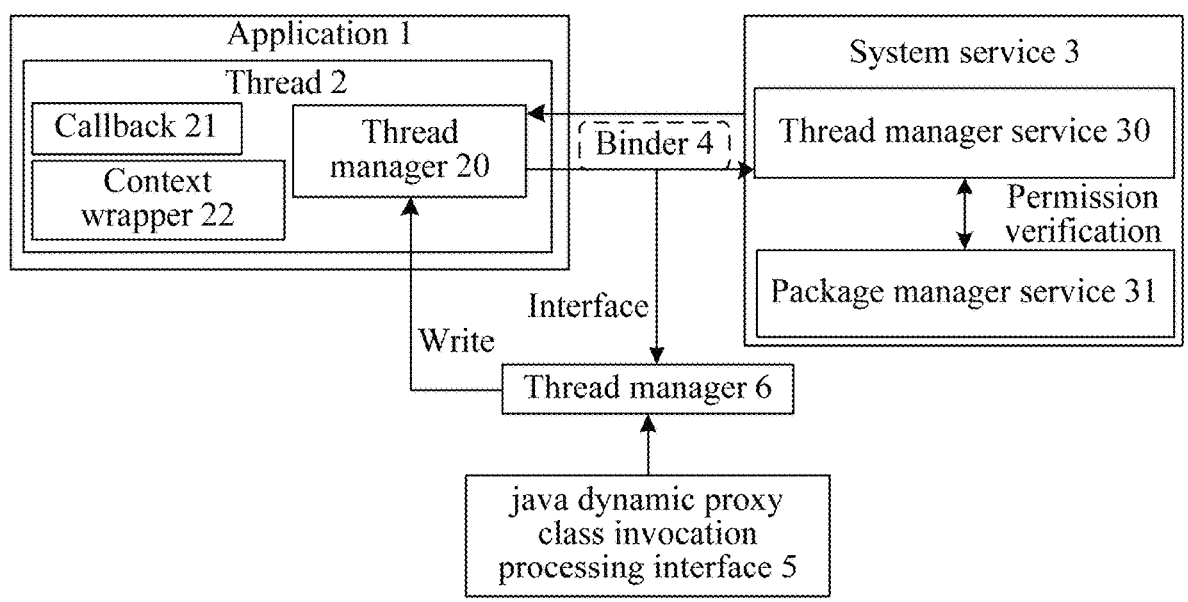
FIG. 1B is a schematic diagram of a DroidPlugin plugin framework solution in the related technology.

An operating system of a current terminal uses the following two plugin framework solutions: First, a conventional plugin framework solution. Referring to FIG. 1A, after a plugin 1 is started, a proxy component, that is, a plugin software development kit (SDK), is used to perform processing such as schedule and manage running of a plugin component (that is, a shell PluginProxyAct run by a plugin (plugin proxy method 2) and a plugin interface continuous class PluginAct (plugin method 3)), and invoke a pluginxxx-Act (xxx method 4). Second, a DroidPlugin plugin framework solution. Referring to FIG. 1B, a dynamic proxy principle (for example, java dynamic proxy proxyInvocationHander (proxy class invocation processing interface 5)) is used to directly intercept a plugin by using an IactivityManager (thread manager 6) when Binder (4) is performed between an IactivityManager (thread manager 20) of an ActivityThread (thread 2) module in an APP (application 1) and an ActivityManagerServive (thread manager service 30) in a System Service (system service 3) module, and the intercepted plugin is written into the thread manager 20 of the thread 2, to bypass permission verification of the thread manager service 30 and a PackageManagerService (package manager service 31) in an operating system, thereby completing running of the plugin component. In addition, the thread 2 further includes: a ContextWrapper (context wrapper 22) component to and a Callback (callback 21) component.

Figure 2A:
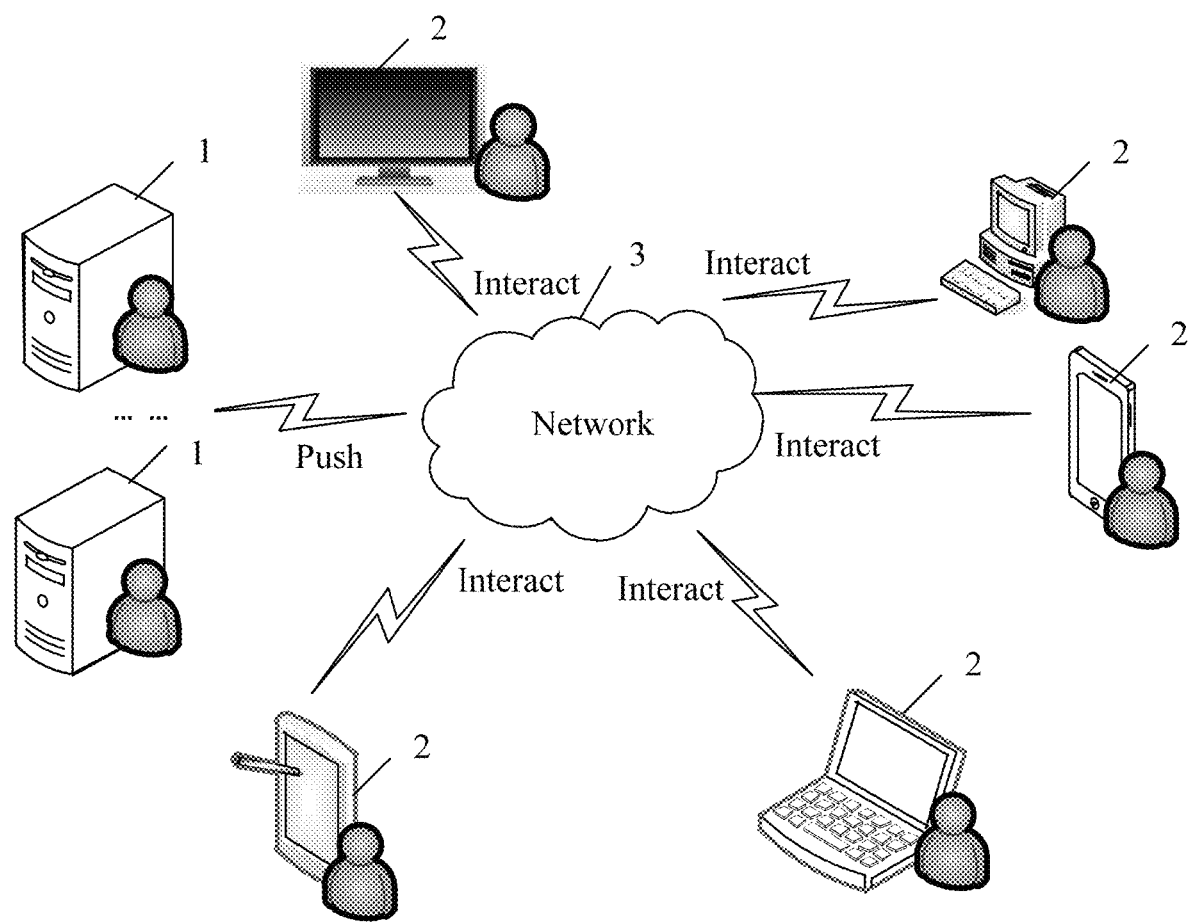
FIG. 2A is a scenario architecture diagram of a plugin loading system according to an embodiment of the present disclosure.

FIG. 2A is a scenario architecture diagram of a plugin loading system according to an embodiment of the present disclosure. The system is used to implement a process of data interaction between a plugin application and a background server. FIG. 2A includes: one or more servers 1, a terminal 2, and a network 3. The network 3 includes a network entity such as a router or a gateway, which is not shown in FIG. 2A. The terminal 2 exchanges information with the server 1 by using a wired network or a wireless network, so as to collect related data information from the terminal 2 and transmit the related data information to the server 1. Types of the terminal are shown in FIG. 2A, and include a mobile phone, a tablet computer or a personal digital assistant (PDA), a desktop computer, a personal computer (PC), a smart television (TV), and the like. The terminal is installed with first applications required by various users, for example, an application with an entertainment function (such as a video application, an audio playing application, a game application, reading software, a chatting application, or a live broadcast application), or an application with a service function (such as a map navigation application, a group purchase application, or a shooting application), or a plugin application such as a micro desktop plugin system.

Based on the large implementation scenario of FIG. 2A, the following embodiments are provided.

Figure 2B:
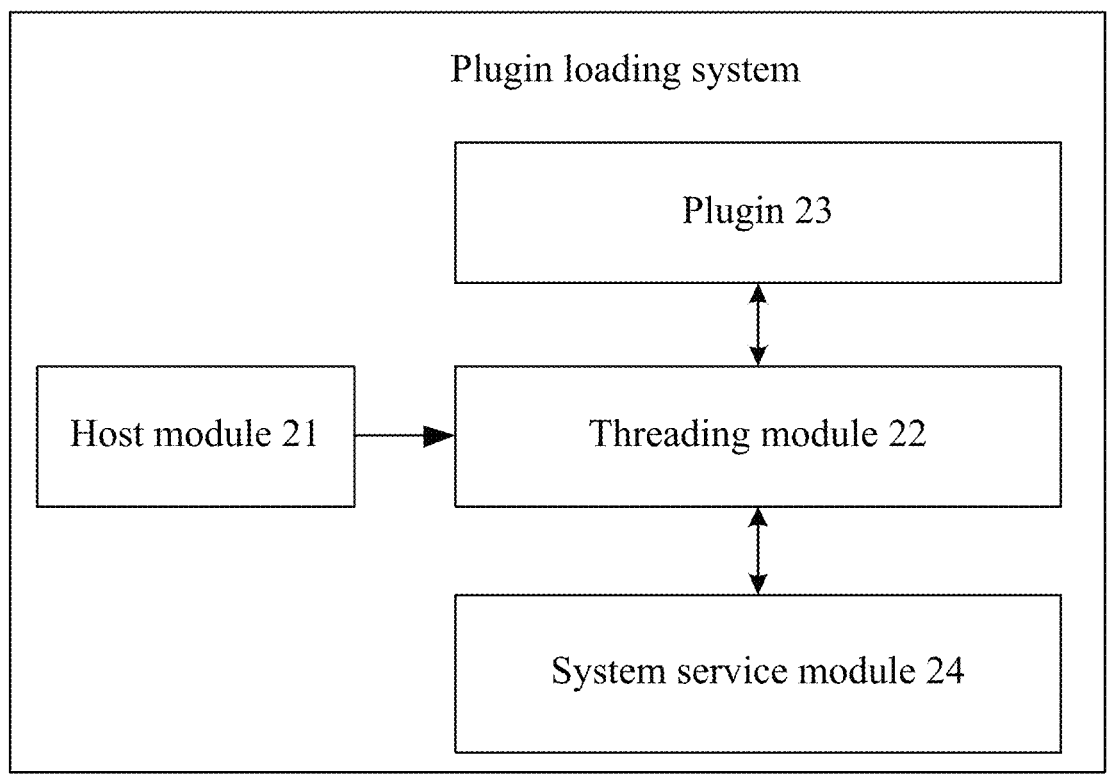
FIG. 2B is a schematic framework diagram of a plugin loading system according to an embodiment of the present disclosure.

An embodiment of the present disclosure provides a plugin loading system. FIG. 2B is a schematic framework diagram of the plugin loading system according to this embodiment of the present disclosure. Referring to FIG. 2B, the system includes: a host module 21, a threading module 22, a plugin 23, and a system service module 24. Herein, the plugin interacts with the system service module by using the threading module, the host module is a child class component of the threading module, that is, the threading module is a parent class component of the host module, and the host module inherits the function of the threading module.

In actual application, the host module is located in a host App of the plugin, and the App may be a micro desktop plugin system (WPTS).

The following describes a plugin loading method in the embodiments of the present disclosure with reference to the system.

To resolve the technical problem in the background, an embodiment of the present disclosure provides a plugin loading method. The method is applied to a host App of a plugin. A function implemented by the method may be implemented by a processor in a terminal by invoking program code. Certainly, the program code may be stored in a computer storage medium. It can be seen that, the terminal run by the host App at least includes a processor and a storage medium. In processes of specific embodiments, applications may be various types of electronic devices with an information processing capability. For example, the terminal may be a mobile phone, a tablet computer, a desktop computer, a PDA, a navigator, a digital phone, a video phone, a TV, or the like. When a plugin is started, an identifier of a plugin component of the plugin is replaced with an identifier of a host component of the host App. After a system permission of the identifier of the host component is verified, the identifier of the host component is replaced with the identifier of the plugin component. Then, the plugin component is constructed to load the plugin. Therefore, the present disclosure addresses existing drawbacks in the field of plugin loading, improving computer-related technologies.

Figure 3A:
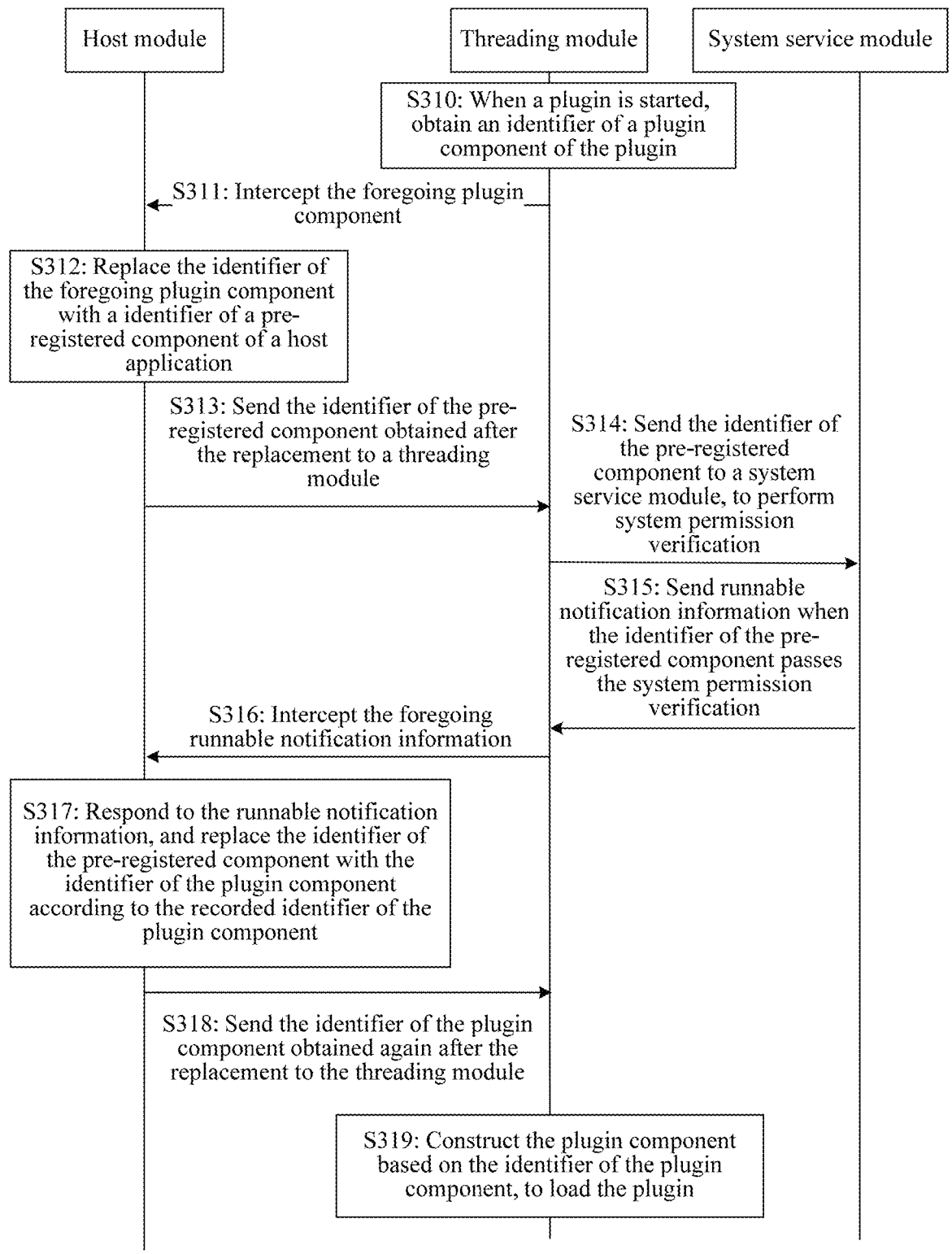
FIG. 3A is a schematic flowchart of a plugin loading method according to an embodiment of the present disclosure.

FIG. 3A is a schematic flowchart of a plugin loading method according to an embodiment of the present disclosure. Referring to FIG. 3A, the method includes:

S310: When a plugin is started, a threading module obtains an identifier of a plugin component of the plugin.

Figure 4A:
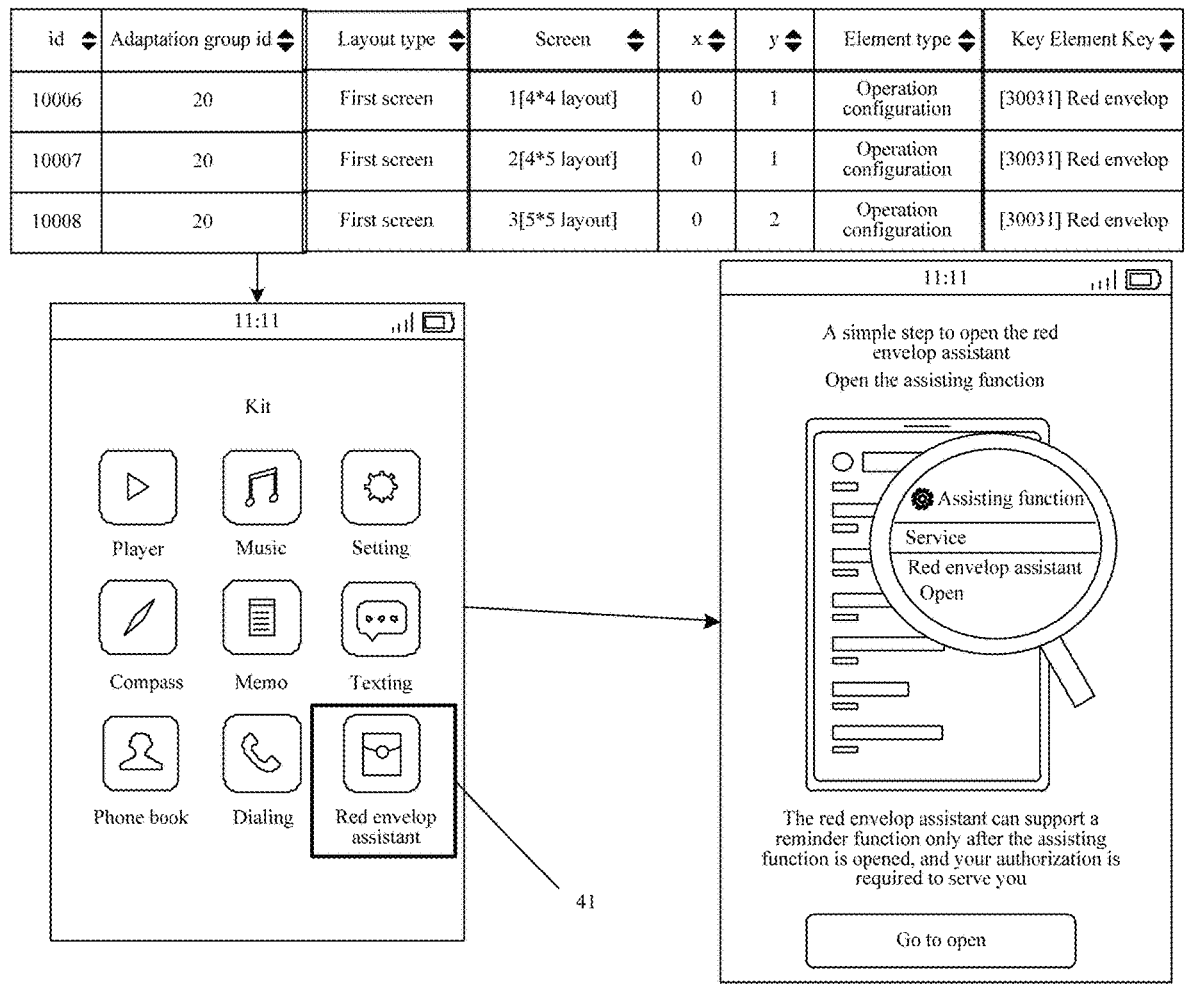
FIG. 4A is a schematic diagram of a desktop interface according to an embodiment of the present disclosure.

Herein, when a user wants to run an uninstalled App by using a micro desktop plugin system, the user may click an icon 41 of the uninstalled App that the user wants to run, such as a red envelop assistant, on a micro desktop interface shown in FIG. 4A. In this case, the red envelop assistant is started as a plugin App of the micro desktop system. Therefore, when the plugin is started, the threading module receives a start request for starting the plugin component from a host App, that is, the micro desktop plugin system, responds to the request, and obtains the identifier of the plugin component of the plugin, such as a ClassName of the component.

For example, in an Android platform, the threading module may be an Activity Thread, and the Activity Thread may include an Instrumentation component, a ContextWrapper component, and a Callback component. Therefore, the Instrumentation component obtains an Activity component of the plugin, and the ContextWrapper component obtains a Service component or a Broadcast Receiver component In actual application, referring to FIG. 4A, a user may configure a desktop icon by using the cloud, and click a micro desktop icon to directly start running the uninstalled App.

S311: A host module intercepts the plugin component, to obtain the identifier of the plugin component.

Herein, because the host module is a child class component of the threading module, the host module can know a class file loaded by a parent class component. In this case, the host module intercepts the plugin component.

For example, in an Android platform, the threading module may include an Instrumentation component, a ContextWrapper component, and a Callback component. Correspondingly, child class components corresponding to the three components may be constructed in the host module. For example, a PluginInstrumentation component corresponding to the Instrumentation component, a PluginContextWrapper component corresponding to the ContextWrapper component, and a PluginCallback component corresponding to the Callback component are constructed. Herein, the child class components inherit the function of the parent class component. In this way, the PluginInstrumentation component may intercept an Activity component started by the Instrumentation component, and the PluginContextWrapper component may intercept a Service component or a Broadcast Receiver component started by the ContextWrapper component.

In actual application, to decrease time delay problems brought by reflection operations, the method further includes: constructing, based on a parents delegation model, the host module corresponding to the threading module.

Figure 3B:
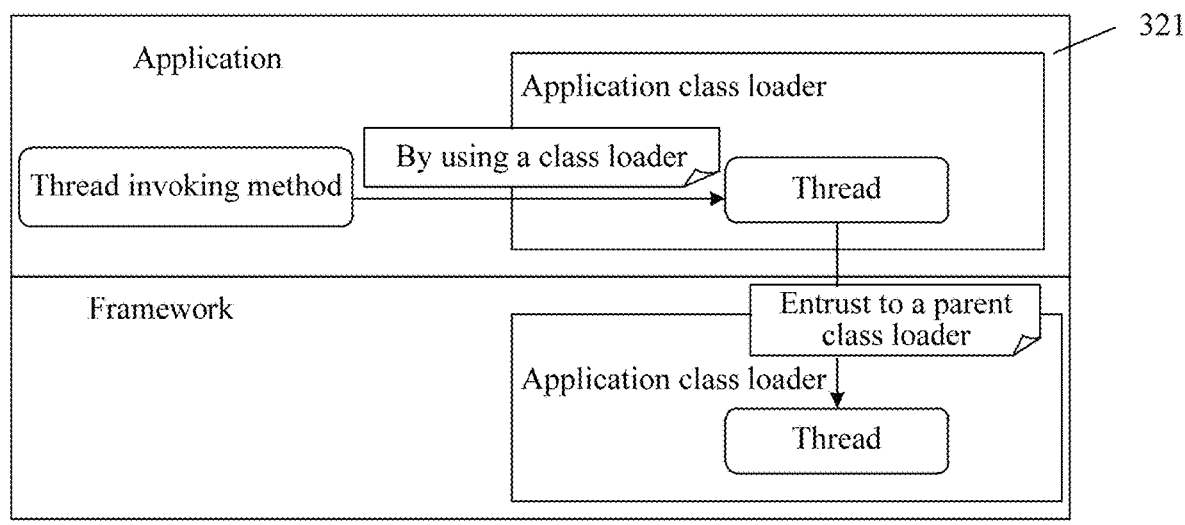
FIG. 3B is a schematic flowchart of a plugin loading method in an Android platform according to an embodiment of the present disclosure.

Herein, FIG. 3B is a schematic diagram of a parents delegation model according to an embodiment of the present disclosure. Referring to FIG. 3B, based on a principle of a host parents delegation model, during compiling, the host module creates a false Activity Thread 321 to cheat that a project environment is compiled successfully, but actually still invokes a class method in the system (namely, invoking an ActivityThread method by using a class loader), to replace an original reflection invoking operation, thereby decreasing the consumed reflection time, and increasing experience on the entire efficiency of the micro desktop plugin system.

Herein, the host module invokes the Activity Thread method by using an APPClassLoader (application class loader) in the Activity Thread 321.

It should be noted that, the class loader is a class of implementation of Java language, and in a first phase of a "loading" process of class loading, a full limited name of a class needs to be used to obtain a binary byte stream that defines this class. A code block that completes this action is a class loader, and this action is implemented outside of a Java virtual machine. The class loader may include: a start class loader, a standard extended class loader, an application degree class loader, and the like. The class loader in this embodiment of the present disclosure may be an application class loader.

The application class loader is implemented by the APPClassLoader, and is responsible for loading a class library specified by a system class path to a memory, so as to directly use a system class loader. Because the application class loader is a return value of a getSystemClassLoader( ) method in the ClassLoader, the application class loader is generally referred to as a system loader.

In this embodiment of the present disclosure, when receiving a loading class request, the application class loader entrusts a loading task to a parent class loader, and performs a loading task in an APPClassLoader of a Framework, to perform recursion successively. If the parent class loader may complete the class loading task, the parent class loader returns from an Activity Thread of the Framework to the Activity Thread 321 successfully. The application class loader completes the loading task only when the parent class loader cannot complete the loading task, thereby ensuring the order of programs.

S312: The host module records the identifier of the plugin component, and replaces the identifier of the plugin component with an identifier of a host component of a host App (application). As the host component of the host App are pre-registered in the host App, the host component of the host App has a permission of the host App.

Herein, before the plugin is started, several common components may be pre-registered in the host App. For example, an Activity component, a Service component, a Broadcast Receiver component and the like are pre-registered. Because these components are registered in the host App, these components have the permission of the host App. Therefore, after the host module intercepts a plugin component, the host module replaces an identifier of the plugin component with an identifier of a host component corresponding to the plugin component, for example, replacing an identifier of the Activity component of the plugin with an identifier of the Activity component of a host App, wherein the Activity component of the host App; or replacing an identifier of the Service component/Broadcast Receiver component of the plugin with an identifier of the Service component/Broadcast Receiver component of the host App, wherein the Service component/Broadcast Receiver component of the host App is pre-registered.

S313: The host module sends the identifier of the host component obtained after the replacement to the threading module.

Herein, after replacing the identifier of the plugin component, the host module sends the identifier of the host component obtained after the replacement to the threading module. For example, the identifier of the pre-registered Activity component is sent to the Instrumentation component in the threading module, and the identifier of the Service component/Broadcast Receiver component is sent to the ContextWrapper component in the threading module.

S314: The threading module sends the identifier of the host component to a system service module, to perform system permission verification.

S315: The system service module sends runnable notification information to the threading module when the identifier of the host component passes the system permission verification.

The runnable notification information indicates that the host component is may be run.

Herein, the threading module invokes the system service module, and sends the identifier of the host component to the system service module, to perform system permission verification on the system service module. For example, the identifier of the pre-registered Activity component is sent to the ActivityManagerService in the system service module, and is forwarded to the PackageManagerService by the ActivityManagerService. The PackageManagerService verifies, according to the identifier, whether the component may be run. Because the pre-registered Activity component has the permission of the host App, when the PackageManagerService performs verification, the pre-registered Activity component may be run. In this case, the PackageManagerService generates runnable notification information, and sends the runnable notification information to the Instrumentation component. On the contrary, if the Activity component sent to the PackageManagerService has not been pre-registered, the PackageManagerService determines that the Activity component may not be run, and the plugin App is prohibited to run.

S316: The host module intercepts the runnable notification information.

S317: The host module responds to the runnable notification information, and replaces the identifier of the host component with the identifier of the plugin component according to the recorded identifier of the plugin component.

Herein, after the threading module receives the runnable notification information, the host module intercepts the runnable notification information, and then, responds to the runnable notification information, and replaces the identifier of the host component with the identifier of the plugin component again.

S318: The host module sends the identifier of the plugin component obtained again after the replacement to the threading module.

Herein, after replacing the identifier of the host component with the identifier of the plugin component again, the host module sends the identifier of the plugin component to a corresponding component in the threading module. For example, the identifier of the Activity component in the plugin component is sent to the Instrumentation component in the threading module, and the identifier of the Service component/Broadcast Receiver component is sent to the Callback component in the threading module.

S319: The threading module constructs the plugin component based on the identifier of the plugin component, to load the plugin.

Herein, the threading module may separately load code and a resource of the plugin component according to an identifier of the plugin component, to load the plugin. For example, the threading module constructs a corresponding class loader (DexClassLoader) based on the identifier of the plugin component, loads plugin code of the plugin component, constructs a corresponding resource manager (AssetManager) based on the identifier of the plugin component, and invokes a newly-added plugin path (addAssetPath) method to load a plugin resource.

In other embodiments of the present disclosure, before the plugin is loaded, the plugin DexClassLoader may be constructed in advance, so that when loading the plugin, the threading module may invoke the DexClassLoader, to load the plugin code, thereby completing scheduling of the plugin code, without the need of installing the plugin code to a system for invoking. Moreover, the threading module may further construct the AssetManager, and invoke the addAssetPath method, to complete dynamic loading of the plugin resource, thereby loading the plugin resource without installing the plugin resource to the system.

Herein, because the addAssetPath method of the AssetManager is a hidden application programming interface (API), in this case, the threading module may invoke the addAssetPath method by using a reflection operation. Certainly, other manners may also be used, and this is not specifically limited in this embodiment of the present disclosure.

Figure 4B:
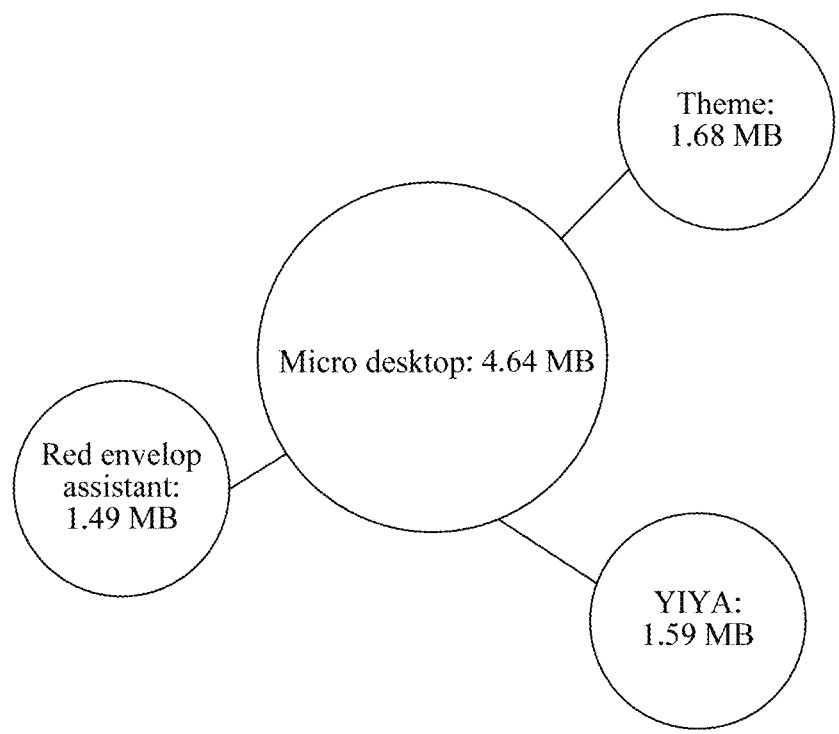
FIG. 4B is a schematic diagram of an application program according to an embodiment of the present disclosure.

So far, the plugin App has bypassed the system permission verification, and because the host module is a child class component of the threading module, and the threading module is a system component of the Android platform, the entire plugin loading process is completely scheduled and run by the system, has an Android component attribute, and further has high adaptation. Further, because the uninstalled App can be run based on a plugin framework, a problem that method counts exceed 65535 is resolved. Further, referring to FIG. 4B, a micro desktop plugin system provided in this embodiment of the present disclosure may decrease 3M-4M tolerance of the micro desktop (including 1.68M of theme, 1.49M of red envelop assistant, and 1.59M of YIYA), and with continuous access of services in the future, the decreased tolerance also increases.

Based on the embodiments, an Android platform is used as an example to describe the method.

Figure 2C:
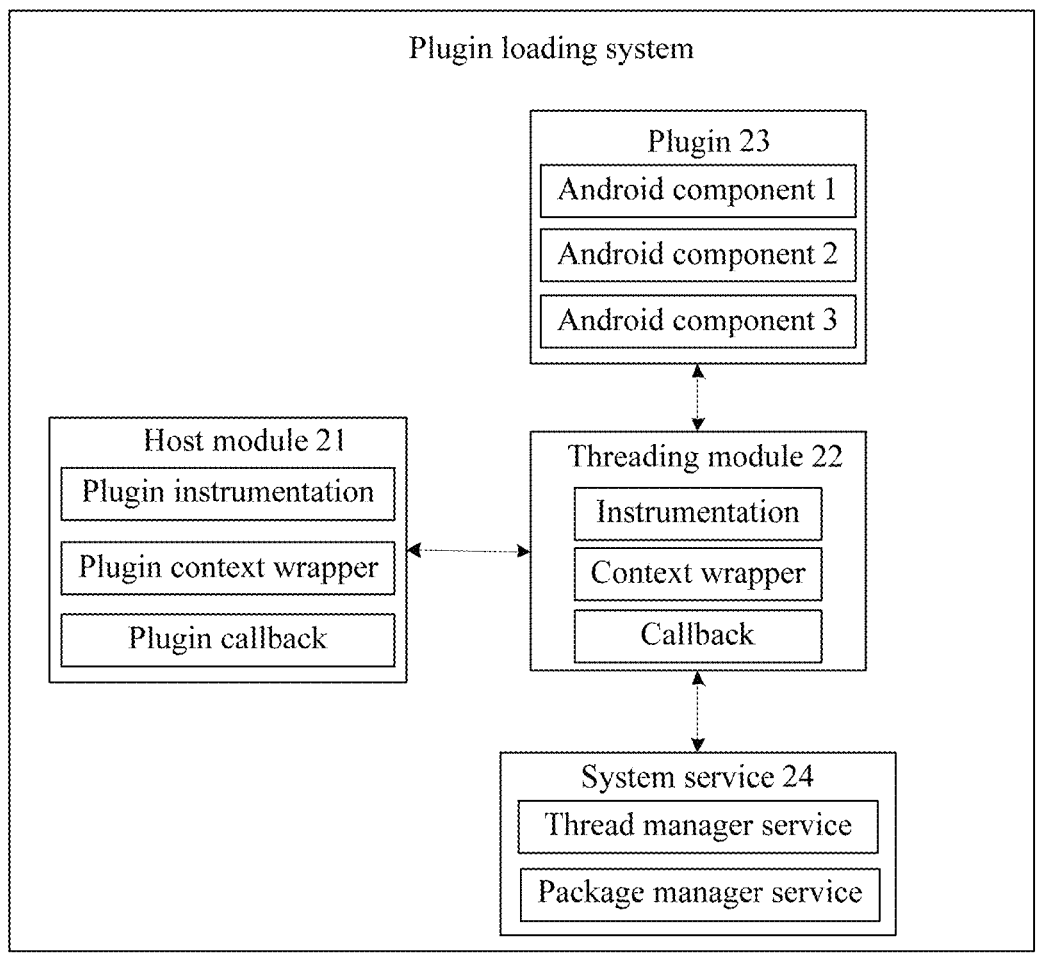
FIG. 2C is a schematic framework diagram of a plugin loading system in an Android platform according to an embodiment of the present disclosure.

FIG. 2C is a schematic framework diagram of a plugin loading system in an Android platform according to an embodiment of the present disclosure. Referring to FIG. 2C, a plugin component of the Plugin 23 includes an Android component 1, an Android component 2, and an Android component 3. Herein, the Android component may be an Activity component, a Service component, a Broadcast Receiver component or the like. The threading module 22 is an Activity Thread 22. The Activity Thread may include an Instrumentation component, a ContextWrapper component, and a Callback component. The host module 21 includes a PluginInstrumentation component corresponding to the Instrumentation component, a PluginContextWrapper component corresponding to the ContextWrapper component, and a PluginCallback component corresponding to the Callback component. The System Service module 24 includes an ActivityManagerService (thread manager service) and a PackageManagerService.

Figure 3C:
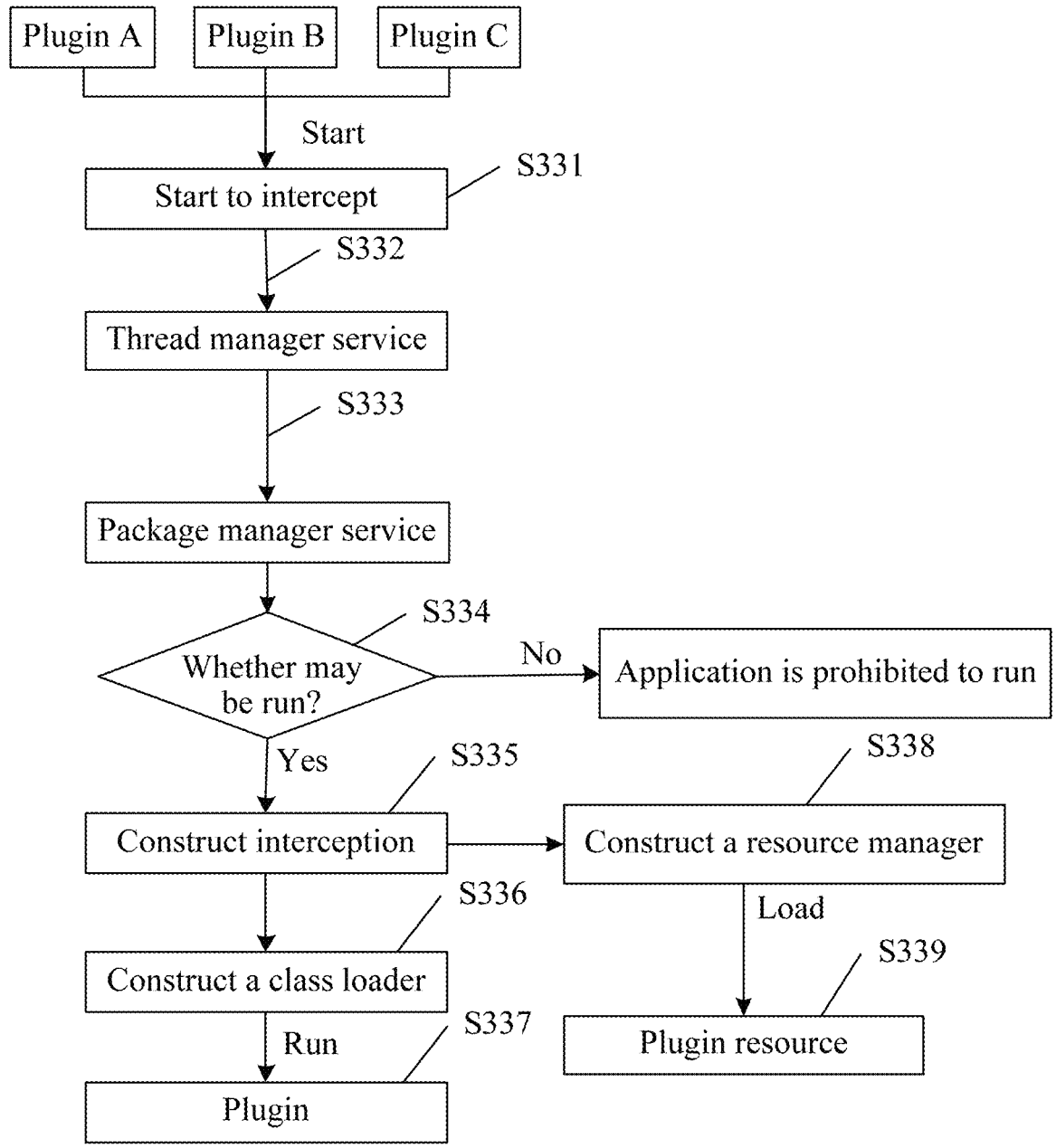
FIG. 3C is a schematic flowchart of a method for updating a plugin according to an embodiment of the present disclosure.

FIG. 3C is a schematic flowchart of a plugin loading method in an Android platform according to an embodiment of the present disclosure. Referring to FIG. 3C, the plugin loading method includes:

S331: The Activity Thread starts a plugin, and when the plugin is started, the host module intercepts a plugin component started on the Activity Thread, and replaces an identifier of the plugin component in a start (Intent) method with an identifier of a host component pre-registered in a host App.

For example, the plugin may be a plugin A, a plugin B, a plugin C, or the like.

S332: The Activity Thread sends the identifier of the host component to the ActivityManagerService (thread manager service).

S333: The ActivityManagerService forwards the identifier to the PackageManagerService.

S334: The PackageManagerService determines whether the host component may be run; and if the host component may be run, sends runnable notification information to the Activity Thread, and skips to S335; otherwise, an application is prohibited to run, and the procedure ends.

S335: The host module intercepts the runnable notification information in the Activity Thread (that is, constructs interception), and replaces the identifier of the plugin component with the identifier of the host component again.

S336: The Activity Thread constructs a DexClassLoader (class loader).

S337: Run plugin code by using the DexClassLoader.

S338: The Activity Thread constructs an AssetManager (resource manager).

S339: The Activity Thread invokes an addAssetPath method in the AssetManager, to load the plugin resource.

Based on the embodiments, in actual application, to improve software experience and interactivity, the method may further include: obtaining new-version information of a plugin from a server; parsing the new-version information, and obtaining a class loader and a resource manager of a corresponding new-version plugin; and covering a class loader and a resource manager of the plugin with the class loader and the resource manager of the new-version plugin.

Figure 3D:
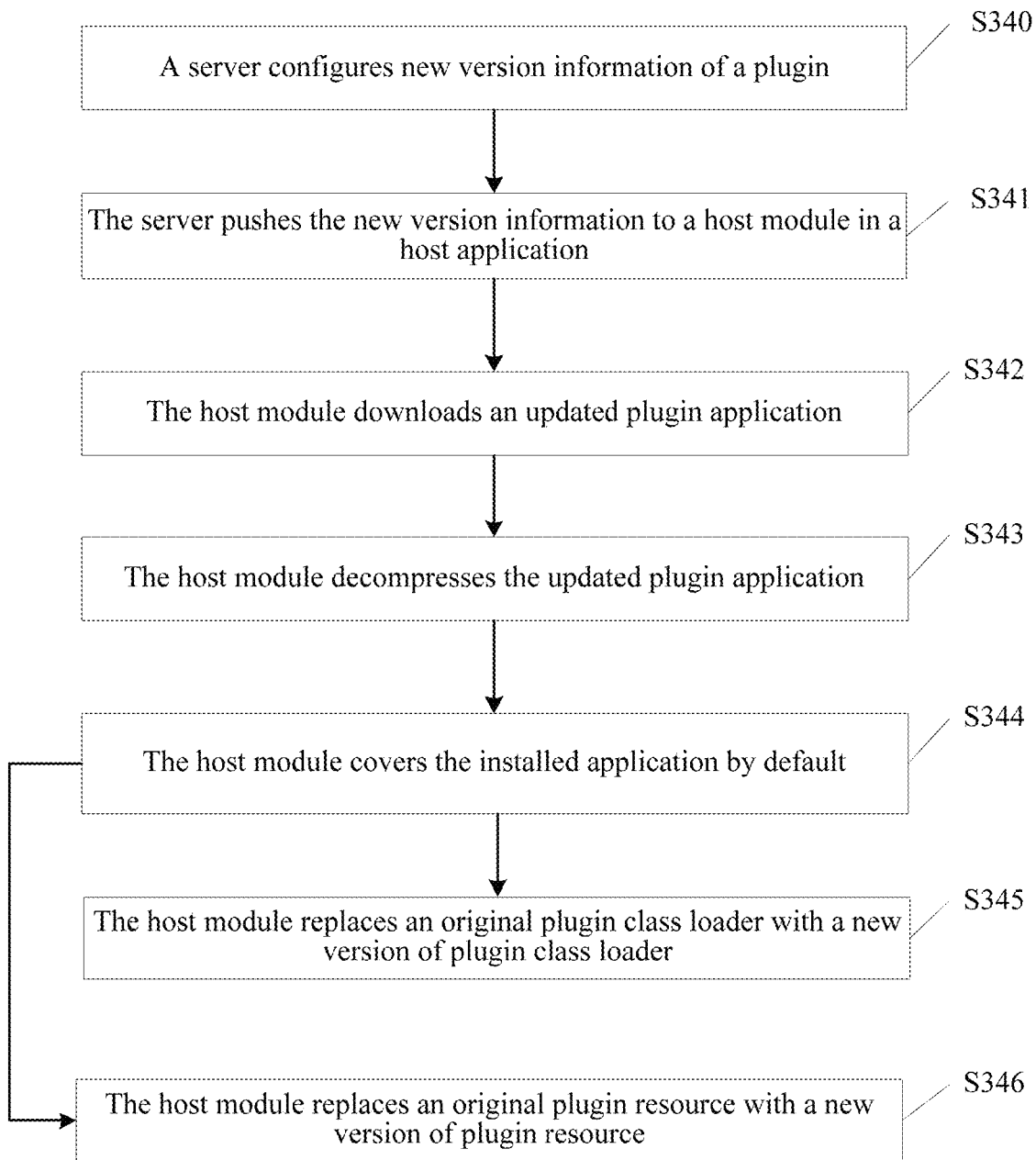
FIG. 3D is a schematic diagram of a parents delegation model according to an embodiment of the present disclosure.

Herein, FIG. 3D is a schematic flowchart of a method for updating a plugin according to an embodiment of the present disclosure. Referring to FIG. 3D, the method further includes:

S340: A server configures new-version information of a plugin.

S341: The server pushes the new-version information to a host module in a host application (App).

S342: The host module downloads an updated plugin application.

S343: The host module decompresses the updated plugin application.

S344: The host module covers the installed application by default.

S345: The host module replaces an original PluginDexClassLoader with a new-version of PluginDexClassLoader.

S346: The host module replaces an original plugin resource AssetManager with a new-version of plugin resource AssetManager.

Based on the embodiments, the method is described from the perspective of the host module.

Figure 5A:
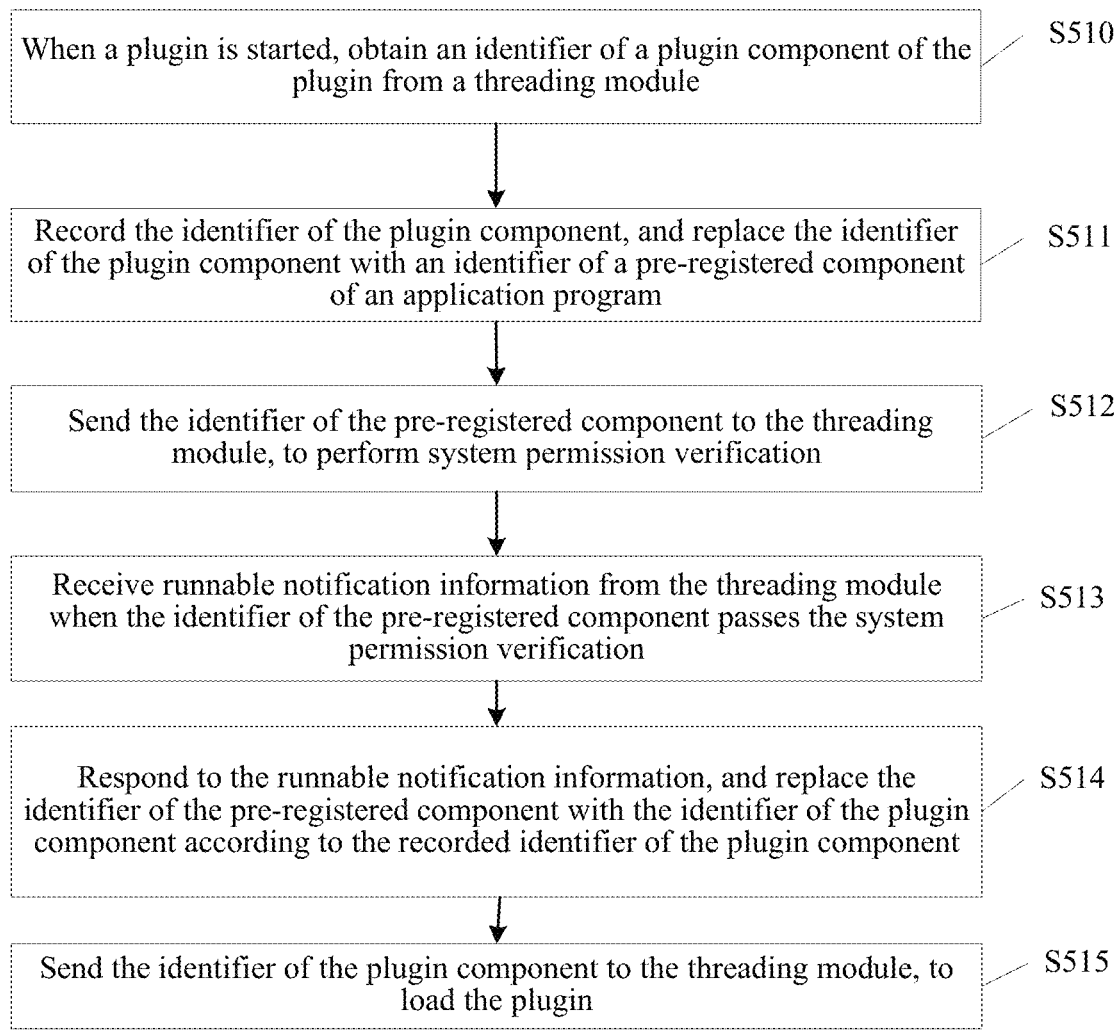
FIG. 5A is a schematic flowchart of a plugin loading method performed by a host module according to an embodiment of the present disclosure.

FIG. 5A is a schematic flowchart of a plugin loading method performed by a host module according to an embodiment of the present disclosure. Referring to FIG. 5A, the method includes:

S510: When a plugin is started, obtain an identifier of a plugin component of the plugin from a threading module.

The threading module is a parent class component of the host module.

S511: Record the identifier of the plugin component, and replace the identifier of the plugin component with an identifier of a host component of an application program.

The application program is a host program of the plugin.

S512: Send the identifier of the host component to the threading module, to perform system permission verification.

S513: Receive runnable notification information from the threading module when the identifier of the host component passes the system permission verification.

S514: Respond to the runnable notification information, and replace the identifier of the host component with the identifier of the plugin component according to the recorded identifier of the plugin component.

S515: Send the identifier of the plugin component to the threading module, to load the plugin.

In other embodiments of the present disclosure, the method may further include: obtaining new-version information of a plugin from a server; parsing the new-version information, and obtaining a class loader and a resource manager of a corresponding new-version plugin; and covering a class loader and a resource manager of the plugin with the class loader and the resource manager of the new-version plugin.

In an optional embodiment of the present disclosure, a plugin loading method provided in the embodiment described from the perspective of the host module may be performed by a terminal, and the terminal includes one or more processors, a storage medium, and one or more programs, where the one or more programs are stored in the storage medium, the program includes one or more units corresponding to a set of instructions, and the one or more processors are configured to execute instructions. A detailed implementation process of the plugin loading method performed by the terminal is consistent with the description of the embodiment of the host module.

Based on the embodiments, the method is described from the perspective of the threading module.

Figure 5B:
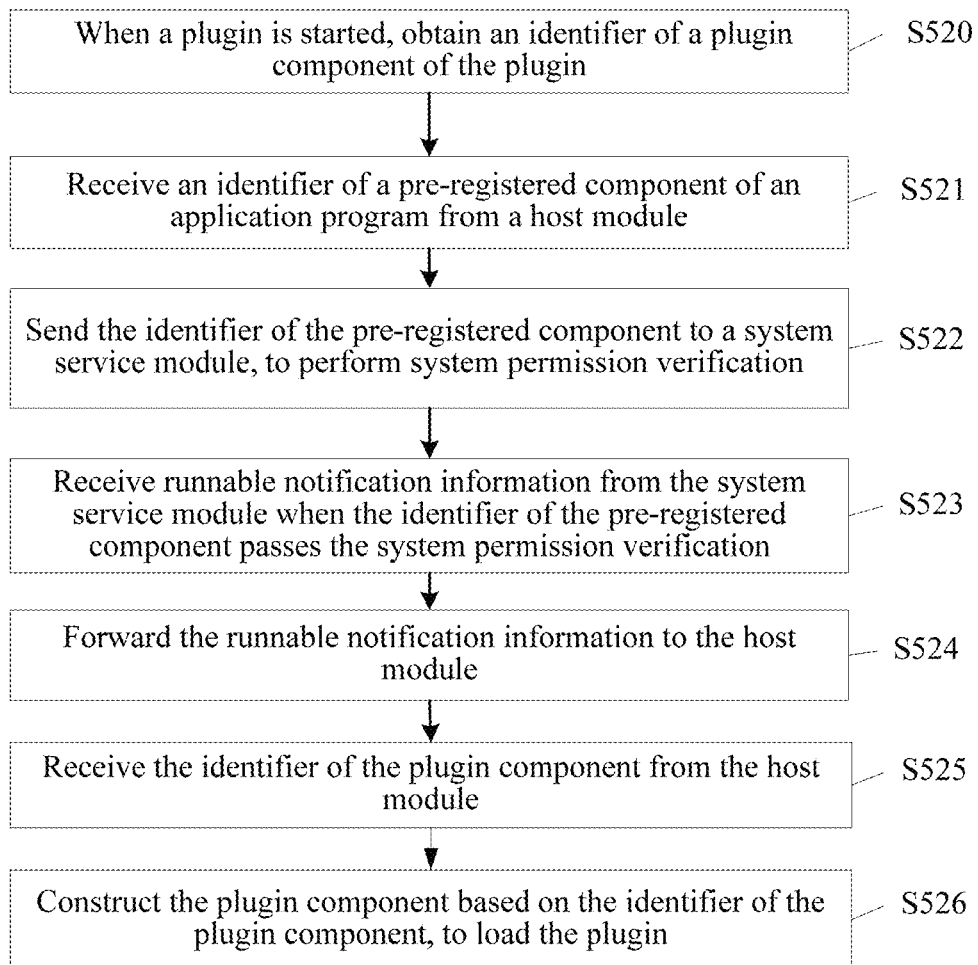
FIG. 5B is a schematic flowchart of a plugin loading method performed by a threading module according to an embodiment of the present disclosure.

FIG. 5B is a schematic flowchart of a plugin loading method performed by a threading module according to an embodiment of the present disclosure. Referring to FIG. 5B, the method includes:

S520: When a plugin is started, obtain an identifier of a plugin component of the plugin.

S521: Receive an identifier of a host component of an application program from a host module.

The threading module is a parent class component of the host module, and the application program is a host program of the plugin.

S522: Send the identifier of the host component to a system service module, to perform system permission verification.

S523: Receive runnable notification information from the system service module when the identifier of the host component passes the system permission verification.

S524: Forward the runnable notification information to the host module.

S525: Receive the identifier of the plugin component from the host module.

S526: Construct the plugin component based on the identifier of the plugin component, to load the plugin.

In other embodiments of the present disclosure, S526 may further include: separately loading code and a resource of the plugin component based on the identifier of the plugin component, to load the plugin.

Herein, the step of separately loading code and a resource of the plugin component may include: loading plugin code of the plugin component by using the DexClassLoader; and loading a plugin resource of the plugin by using the add-AssetPath method in the AssetManager.

In other embodiments of the present disclosure, the method may further include: constructing, based on a parents delegation model, the host module corresponding to the threading module.

In an optional embodiment of the present disclosure, a plugin loading method provided in the embodiment described from the perspective of the threading module may be performed by a terminal, and the terminal includes one or more processors, a storage medium, and one or more programs, where the one or more programs are stored in the storage medium, the program includes one or more units corresponding to a set of instructions, and the one or more processors are configured to execute instructions. A detailed implementation process of the plugin loading method performed by the terminal is consistent with the description of the embodiment of the threading module.

Based on the same inventive concept, an embodiment of the present disclosure provides a plugin loading apparatus, and the apparatus may be the host module according to the one or more embodiments.

Figure 6:
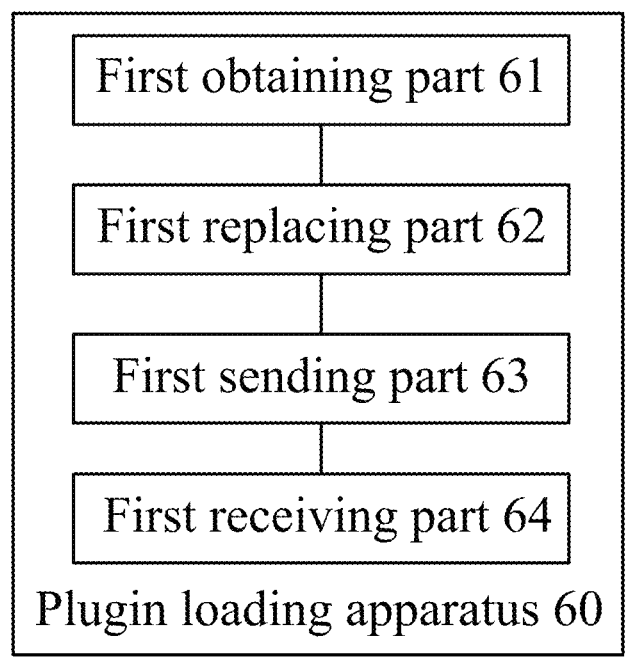
FIG. 6 is a schematic structural diagram of a plugin loading apparatus according to an embodiment of the present disclosure.

Referring to a plugin loading apparatus 60 shown in FIG. 6, the apparatus 60 includes: a first obtaining part 61, configured to: when a plugin is started, obtain an identifier of a plugin component of the plugin from a threading module, the threading module being a parent class component of an apparatus to which the threading module belongs; a first replacing part 62, configured to record the identifier of the plugin component, and replace the identifier of the plugin component with an identifier of a host component of an application program, the application program being a host program of the plugin; a first sending part 63, configured to send the identifier of the host component to the threading module, to perform system permission verification; and a first receiving part 64, configured to receive runnable notification information from the threading module when the identifier of the host component passes the system permission verification, the first replacing part 62 being further configured to respond to the runnable notification information, and replace the identifier of the host component with the identifier of the plugin component and the first sending part 63 being further configured to send the identifier of the plugin component to the threading module, to load the plugin.

In other embodiments of the present disclosure, the apparatus further includes: the first obtaining part 61 being further configured to obtain new-version information of a plugin from a server; a parsing part 65, configured to parse the new-version information, and obtain a class loader and a resource manager of a corresponding new-version plugin; and an updating part 66, configured to replace a class loader and a resource manager of the plugin with the class loader and the resource manager of the new-version plugin.

The description of the apparatus embodiment is similar to the description of the method, and has same beneficial effects as the method embodiments. For the technical details undisclosed in the apparatus embodiments of the present disclosure, refer to the method embodiments of the present disclosure by a person skilled in the art for understanding.

Based on the same inventive concept, the present disclosure provides a plugin loading apparatus, and the apparatus may be the threading module according to the one or more embodiments.

Figure 7:
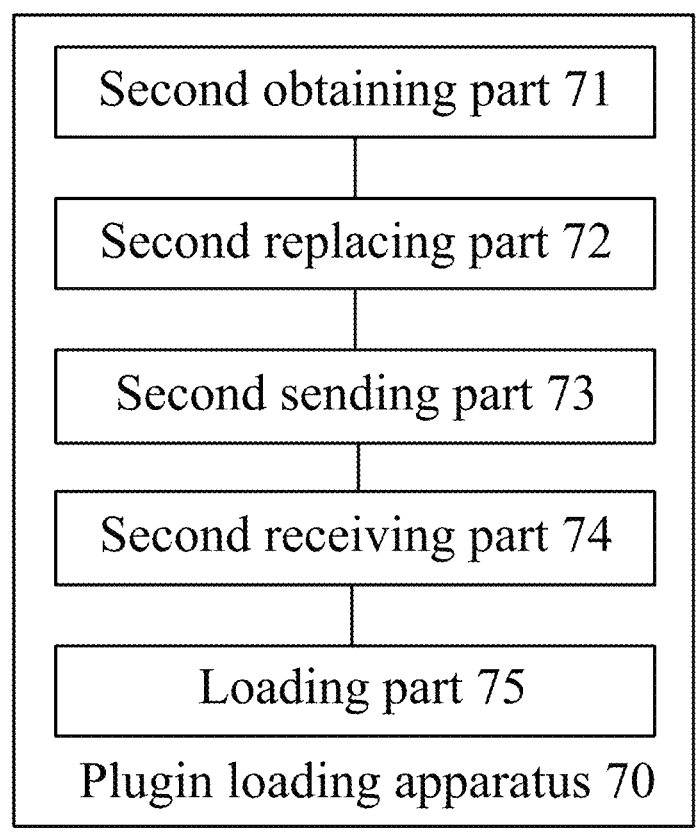
FIG. 7 is another schematic structural diagram of a plugin loading apparatus according to an embodiment of the present disclosure.

Referring to a plugin loading apparatus 70 shown in FIG. 7, the apparatus 70 includes: a second obtaining part 71, configured to: when a plugin is started, obtain an identifier of a plugin component of the plugin; a second replacing part 72, configured to receive an identifier of a host component of an application program from a host module, a threading module being a parent class component of an apparatus to which the threading module belongs, and the application program being a host program of the plugin; a second sending part 73, configured to send the identifier of the host component to a system service module, to perform system permission verification; a second receiving part 74, configured to receive runnable notification information from the system service module when the identifier of the host component passes the system permission verification, the second sending part 73 being further configured to forward the runnable notification information to the host module; and the second receiving part 74 being further configured to receive the identifier of the plugin component from the host module; and a loading part 75, configured to construct the plugin component based on the identifier of the plugin component, to load the plugin.

In other embodiments of the present disclosure, the loading part 75 is specifically configured to separately load code and a resource of the plugin component based on the identifier of the plugin component, to load the plugin.

In other embodiments of the present disclosure, the loading part 75 is further specifically configured to load plugin code of the plugin component by using a class loader; and load a plugin resource of the plugin by using a newly-added plugin path method in a resource manager.

In other embodiments of the present disclosure, the apparatus further includes: a constructing part 76, configured to construct, based on a parents delegation model, the host module corresponding to the threading module.

The host module, the threading module, and the system service module in this embodiment of the present disclosure may be modules in the terminal.

Figure 8:
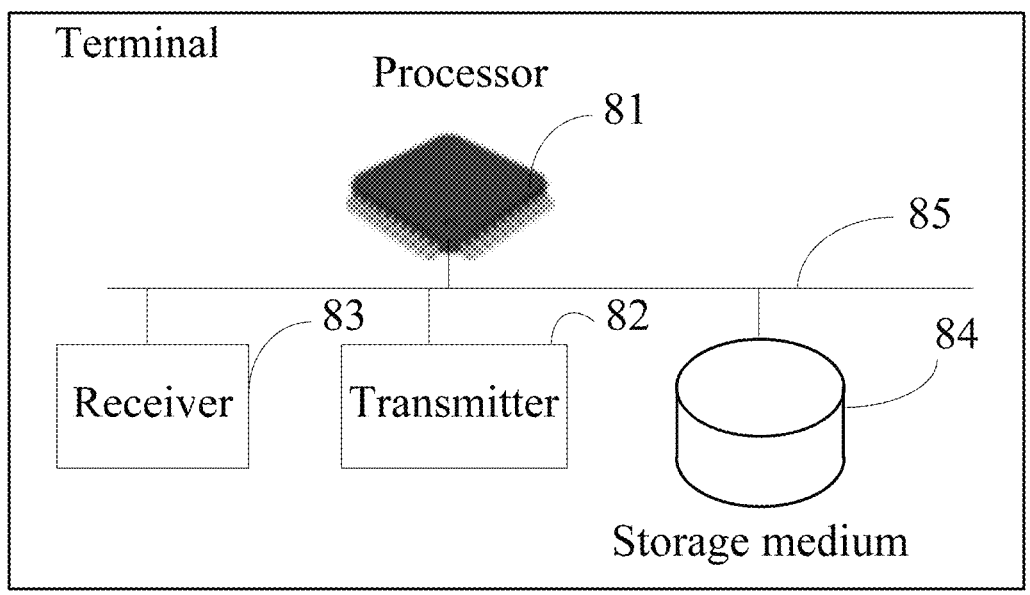
FIG. 8 is a schematic structural diagram of an entity terminal of a plugin loading apparatus according to an embodiment of the present disclosure.

As shown in FIG. 8, in actual application, an entity of a plugin loading apparatus may be a terminal. Therefore, the first obtaining part 61, first replacing part 62, parsing part 65, updating part 66, second obtaining part 71, second replacing part 72, loading part 75, and constructing part 76 may all be located on a processor 81 on the terminal to be implemented, may be implemented by a central processing unit (CPU), a micro processing unit (MPU), a digital signal processor (DSP), a field programmable gate array (FPGA) or the like. The first sending part 63 and the second sending part 73 may be implemented by a transmitter 82, the first receiving part 64 and the second receiving part 74 may be implemented by a receiver 83, and the terminal further includes a storage medium 84. All information and software code thereof mentioned in the embodiments of the present disclosure, such as an identifier of a plugin and software code thereof, an identifier of a host component of an application program and software code thereof, runnable notification information and software code thereof, and new-version information and software code thereof may be stored in the storage medium 84. The storage medium 84, the transmitter 82, and the receiver 83 may be connected to the processor 81 by using a system bus 85. The storage medium 84 is configured to store executable program code, the program code includes computer operation instructions, and the storage medium 84 may include a high-speed RAM memory, or may further include a nonvolatile memory, for example, at least one magnetic disk memory.

In the embodiments of the present disclosure, when the plugin loading method is implemented in a form of a software functional module and sold or used as an independent product, the method may be stored in a computer-readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a server, a network device, or the like) to perform all or some of the methods in the embodiments of the present disclosure. The storage medium includes: any medium that can store program code, such as a USB flash drive, a removable hard disk, a read-only memory (ROM), a magnetic disk, or an optical disc. In this way, the embodiments of the present disclosure are not limited to any specific combination of hardware and software.

An embodiment of the present disclosure provides a computer readable storage medium, which stores machine instructions, and when the machine instructions are executed by one or more processors, the processor performs the plugin loading method.

An embodiment of the present disclosure provides a terminal, including:

a storage medium, configured to store executable instructions; and a processor, configured to execute the stored executable instructions, the executable instructions being configured to perform the plugin loading method.

Herein, it should be noted that, the description about the apparatus embodiment is similar to the description about the method embodiment. The apparatus embodiment has beneficial effects same as the method embodiment, and therefore is not described again. For the technical details undisclosed in the apparatus embodiments of the present disclosure, refer to the method embodiments of the present disclosure by a person skilled in the art for understanding. To reduce space, details are not described herein again.

It should be understood that, "one embodiment" or "an embodiment" mentioned throughout this specification means that a specific feature, structure, or characteristic related to the embodiments is included in at least one embodiment of the present disclosure. Therefore, "in one embodiment" or "in an embodiment" in the entire specification does not necessarily refer to a same embodiment. In addition, the specific feature, structure, or characteristic may be any suitable manner combined in one or more embodiments. It should be understood that, in various embodiments of the present disclosure, the sequence numbers of the processes do not mean the execution sequence. The execution sequence of the processes should be determined according to the function and internal logic, and should not constitute any limitation to the implementation processes of the embodiments of the present disclosure. The sequence numbers of the preceding embodiments of the present disclosure are merely for description purpose but do not indicate the preference of the embodiments.

It should be noted that, the terms "include", "comprise", and any variants thereof herein are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

In the several embodiments provided in the present application, it should be understood that the disclosed device and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, the functional units in the embodiments of the present disclosure may all be integrated into one processing unit, or each of the units may independently serve as one unit, or two or more units may be integrated into one unit. The integrated unit may be implemented in the form of hardware, or may be implemented in the form of a hardware plus software functional unit.

A person of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program code, such as a removable storage device, a read only memory (ROM), a magnetic disk, and an optical disc.

Alternatively, when the integrated units are implemented in a form of a software functional module and sold or used as an independent product, the modules may be stored in a computer-readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a server, a network device, or the like) to perform all or some of the methods in the embodiments of the present disclosure. The storage medium includes various media that may store processing code, such as a removable storage device, a ROM, a magnetic disk, and an optical disc.

The descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

In the embodiments of the present disclosure, a child class threading module is constructed to replace an original parent class component function of a system, to guarantee that a plugin component bypasses system permission verification to run in a system environment, thereby ensuring the plugin component with an original component attribute of the system and further with high adaptation. When a plugin is started, an identifier of a plugin component of the plugin is replaced with an identifier of a host component of the host App. After a system permission of the identifier of the host component is verified, the identifier of the host component is replaced with the identifier of the plugin component. Then, the plugin component is constructed to load the plugin. Therefore, the present disclosure addresses existing drawbacks in the field of plugin loading, improving computer-related technologies.

What is claimed is:

1. A method for plugin loading, the method comprising:
    when a plugin is started, obtaining, by a device comprising a memory and a processor in communication with the memory, an identifier of a plugin component of the plugin from a threading module, the threading module being a parent class component of a host module;
    recording, by the device, the identifier of the plugin component, and replacing the identifier of the plugin component with an identifier of a host component of an application program, the application program being a host program of the plugin;
    sending, by the device, the identifier of the host component to the threading module, to perform system permission verification;
    receiving, by the device, runnable notification information from the threading module when the identifier of the host component passes the system permission verification, wherein the host component of the application program is pre-registered with the host program and has a permission to run from the host program;
    in response to the received runnable notification information, replacing, by the device, the identifier of the host component with the identifier of the plugin component according to the recorded identifier of the plugin component; and
    sending, by the device, the identifier of the plugin component to the threading module, to load the plugin.

2. The method according to claim 1, wherein the sending, by the device, the identifier of the host component to the threading module, to perform system permission verification comprises:
    sending, by the device, the identifier of the host component to the threading module;
    sending, by the threading module, the identifier of the host component to a system service module;
    determining, by the system service module, whether the identifier of the host component passes the system permission verification;
    in response to the determination that the identifier of the host component passes the system permission verification, sending, by the system service module, the runnable notification information to the threading module; and
    forwarding, by the threading module, the runnable notification information to the host module.

3. The method according to claim 1, wherein the sending, by the device, the identifier of the plugin component to the threading module, to load the plugin comprises:
    sending, by the device, the identifier of the plugin component to the threading module, so that the threading module is configured to construct the plugin component based on the identifier of the plugin component to load the plugin.

4. The method according to claim 3, further comprising, constructing, by the threading module, the plugin component based on the identifier of the plugin component to load the plugin; and
    separately loading, by the threading module, a code and a resource of the plugin component based on the identifier of the plugin component, to load the plugin.

5. The method according to claim 3, wherein, when the threading module constructs the plugin component based on the identifier of the plugin component to load the plugin, the method further comprises:
    loading, by the threading module, a plugin code of the plugin component based on the identifier of the plugin component by using a class loader; and
    loading, by the threading module, a plugin resource of the plugin based on the identifier of the plugin component by using a newly-added plugin path method in a resource manager.

6. An apparatus for plugin loading, the apparatus comprising:
    a memory storing instructions; and
    a processor in communication with the memory, wherein, when the processor executes the instructions, the processor is configured to cause the apparatus to:
        when a plugin is started, obtain an identifier of a plugin component of the plugin from a threading module, the threading module being a parent class component of a host module,
        record the identifier of the plugin component, and replace the identifier of the plugin component with an identifier of a host component of an application program, the application program being a host program of the plugin,
        send the identifier of the host component to the threading module, to perform system permission verification,
        receive runnable notification information from the threading module when the identifier of the host component passes the system permission verification, wherein the host component of the application program is pre-registered with the host program and has a permission to run from the host program;
        in response to the received runnable notification information, replace the identifier of the host component with the identifier of the plugin component according to the recorded identifier of the plugin component, and
        send the identifier of the plugin component to the threading module, to load the plugin.

7. The apparatus according to claim 6, wherein, when the processor executes the instructions, the processor is configured to further cause the apparatus to:

obtain new-version information of a plugin from a server;
parse the new-version information;
obtain a new-version class loader and a new-version resource manager of a new-version plugin corresponding to the new-version information; and
replace a class loader and a resource manager of the plugin with the new-version class loader and the new-version resource manager of the new-version plugin.

8. The apparatus according to claim 6, wherein, when the processor is configured to cause the apparatus to send the identifier of the host component to the threading module, to perform system permission verification, the processor is configured to cause the apparatus to:
send the identifier of the host component to the threading module, so that:
the threading module is configured to send the identifier of the host component to a system service module,
the system service module is configured to determine whether the identifier of the host component passes the system permission verification,
in response to the determination that the identifier of the host component passes the system permission verification, the system service module send the runnable notification information to the threading module, and
the threading module forwards the runnable notification information to the host module.

9. The apparatus according to claim 6, wherein, when the processor is configured to cause the apparatus to send the identifier of the plugin component to the threading module, to load the plugin, the processor is configured to cause the apparatus to:
send the identifier of the plugin component to the threading module, so that the threading module is configured to construct the plugin component based on the identifier of the plugin component to load the plugin.

10. The apparatus according to claim 9, wherein, when the threading module is configured to construct the plugin component based on the identifier of the plugin component to load the plugin, the threading module is configured to:
separately load a code and a resource of the plugin component based on the identifier of the plugin component, to load the plugin.

11. The apparatus according to claim 9, wherein, when the threading module is configured to construct the plugin component based on the identifier of the plugin component to load the plugin, the threading module is configured to:
load a plugin code of the plugin component based on the identifier of the plugin component by using a class loader; and
load a plugin resource of the plugin based on the identifier of the plugin component by using a newly-added plugin path method in a resource manager.

12. A non-transitory computer readable storage medium storing instructions, wherein the instructions, when executed by a processor, cause the processor to:
when a plugin is started, obtain an identifier of a plugin component of the plugin from a threading module, the threading module being a parent class component of a host module;
record the identifier of the plugin component, and replacing the identifier of the plugin component with an identifier of a host component of an application program, the application program being a host program of the plugin;
send the identifier of the host component to the threading module, to perform system permission verification;
receive runnable notification information from the threading module when the identifier of the host component passes the system permission verification, wherein the host component of the application program is pre-registered with the host program and has a permission to run from the host program;
in response to the received runnable notification information, replace the identifier of the host component with the identifier of the plugin component according to the recorded identifier of the plugin component; and
send the identifier of the plugin component to the threading module, to load the plugin.

13. The non-transitory computer readable storage medium according to claim 12, wherein the instructions, when executed by a processor, cause the processor to:
obtain new-version information of the plugin from a server;
parse the new-version information;
obtain a new-version class loader and a new-version resource manager of a new-version plugin corresponding to the new-version information; and
replace a class loader and a resource manager of the plugin with the new-version class loader and the new-version resource manager of the new-version plugin.

14. The non-transitory computer readable storage medium according to claim 12, wherein, when the instructions cause the processor to perform sending the identifier of the host component to the threading module, to perform system permission verification, the instructions cause the processor to:
send the identifier of the host component to the threading module, so that:
the threading module is configured to send the identifier of the host component to a system service module,
the system service module is configured to determine whether the identifier of the host component passes the system permission verification,
in response to the determination that the identifier of the host component passes the system permission verification, the system service module send the runnable notification information to the threading module, and
the threading module forwards the runnable notification information to the host module.

15. The non-transitory computer readable storage medium according to claim 12, wherein, when the instructions cause the processor to perform sending the identifier of the plugin component to the threading module, to load the plugin, the instructions cause the processor to:
send the identifier of the plugin component to the threading module, so that the threading module is configured to construct the plugin component based on the identifier of the plugin component to load the plugin.

16. The non-transitory computer readable storage medium according to claim 15, wherein, when the threading module is configured to construct the plugin component based on the identifier of the plugin component to load the plugin, the threading module is configured to:
load a plugin code of the plugin component based on the identifier of the plugin component by using a class loader; and
load a plugin resource of the plugin based on the identifier of the plugin component by using a newly-added plugin path method in a resource manager.

17. A method for plugin loading, the method comprising:
when a plugin is started, obtaining, by a device comprising a memory and a processor in communication with the memory, an identifier of a plugin component of the plugin from a threading module, the threading module being a parent class component of a host module;

recording, by the device, the identifier of the plugin component, and replacing the identifier of the plugin component with an identifier of a host component of an application program, the application program being a host program of the plugin;

sending, by the device, the identifier of the host component to the threading module, to perform system permission verification;

receiving, by the device, runnable notification information from the threading module when the identifier of the host component passes the system permission verification;

in response to the received runnable notification information, replacing, by the device, the identifier of the host component with the identifier of the plugin component according to the recorded identifier of the plugin component;

sending, by the device, the identifier of the plugin component to the threading module, to load the plugin;

obtaining, by the device, new-version information of the plugin from a server;

parsing, by the device, the new-version information;

obtaining, by the device, a new-version class loader and a new-version resource manager of a new-version plugin corresponding to the new-version information; and replacing, by the device, a class loader and a resource manager of the plugin with the new-version class loader and the new-version resource manager of the new-version plugin.

* * * * *